United States Patent [19]

Egawa

[11] Patent Number: 5,001,621

[45] Date of Patent: Mar. 19, 1991

[54] INVERTER DEVICE INCLUDING PARALLEL RESONANT CIRCUIT USING A TOTAL EQUIVALENT CAPACITANCE

[75] Inventor: Akira Egawa, Yamanashi, Japan

[73] Assignee: Fanuc Ltd, Minamitsuru, Japan

[21] Appl. No.: 427,095

[22] PCT Filed: Feb. 23, 1989

[86] PCT No.: PCT/JP89/00194

§ 371 Date: Oct. 6, 1989

§ 102(e) Date: Oct. 6, 1989

[87] PCT Pub. No.: WO89/08348

PCT Pub. Date: Sep. 8, 1989

[30] Foreign Application Priority Data

Feb. 25, 1988 [JP] Japan .................................. 63-43167

[51] Int. Cl.[5] .............................................. H02M 7/537
[52] U.S. Cl. ...................................... 363/132; 363/17; 363/40
[58] Field of Search .................... 363/16, 17, 95, 98, 363/39, 40, 131, 132

[56] References Cited

U.S. PATENT DOCUMENTS

| | | | |
|---|---|---|---|
| 4,212,053 | 7/1980 | Sichenzia | 363/39 |
| 4,504,895 | 3/1985 | Steigerwald | 363/17 |
| 4,566,059 | 1/1986 | Gallios et al. | 363/56 |
| 4,758,940 | 7/1988 | Steigerwald | 363/17 |

Primary Examiner—Peter S. Wong
Attorney, Agent, or Firm—Staas & Halsey

[57] ABSTRACT

An inverter device is provided, which carries out a switching action in response to a drive signal ($V_{GS1}-V_{GS4}$) having a single frequency. An inductance element (L) is connected in parallel with the output terminals of the device and capable of a parallel resonance with a total equivalent capacitance which is the sum of an equivalent electrostatic capacitance of the inverter device (Q1−Q4), as observed from the output terminals toward an input side, and an equivalent electrostatic capacitance of a load (LO). With this arrangement, the charge and discharge loss due to the source-drain capacitance ($C_{OSS1}-C_{OSS4}$) is reduced, and the efficiency is improved.

8 Claims, 7 Drawing Sheets

INVERTER DEVICE INCLUDING PARALLEL RESONANT CIRCUIT USING A TOTAL EQUIVALENT CAPACITANCE

CROSS REFERENCE TO RELATED APPLICATIONS

This application is related to the following pending U.S. patent applications: Ser. No. 07/295,203, now U.S. Pat. No. 4,887,272, Ser. No. 07/283,478, now U.S. Pat. No. 4,921,357, Ser. No. 07/283,479, now U.S. Pat. No. 4,930,135, and Ser. No. 07/363,516 now U.S. Pat No. 4,964,136.

Technical Field

The present invention relates to an inverter device, and more particularly, to an inverter device which includes a MOS (metal-oxide-semiconductor) transistor, more generally, a MIS (metal-insulator-semiconductor) transistor. The MIS transistor is connected in series between a d.c. power input and a load and in which the MOS transistor is driven by a drive signal having a single frequency so as to convert d.c. power into a.c. power.

The device according to the invention can be used, e.g., for a high-frequency power supply of an RF (radio frequency) pumping $CO_2$ (carbonic acid gas) laser device or a high-frequency induction heating power supply.

BACKGROUND ART

It is generally known that, in inverter devices of the above-mentioned type, an equivalent output capacitance $C_{OSS}$ exists between the drain and the source of the MOS transistor. This output capacitance is a parasitic capacitance produced when the transistor is manufactured, and is the main cause of a power drop occurring during a high-frequency operation.

Namely, an electric current which charges and discharges the output capacitance flows at each switching of the MOS transistor and is consumed by the on-state resistance of the transistor, whereby the loss increases in proportion to the frequency.

Furthermore, a maximum electric power that can be input to the inverter is restricted by the peak value of a voltage applied to the source and drain of the transistor during operation. That is, the input power is limited to less than the maximum rated voltage of the transistor.

SUMMARY OF THE INVENTION

The present invention has been created in view of the above problem that a sufficient output power cannot be obtained during high-frequency operation since the allowable input power and the output efficiency of the device are low, and an object of the invention is to provide a high-power inverter device having an improved input power and efficiency but still satisfactorily practical.

To achieve the above object, according to the invention, there is provided an inverter device including input terminals for a d.c. voltage input, output terminals connected to a load, an inductance element (RFC) connected in series between at least one of the input terminals and a d.c. input power supply, and at least one MIS transistor connected in series between the input terminal and the output terminals and carrying out a switching action in response to a drive signal having a single frequency. The inverter device of the invention is characterized by comprising an inductance element connected in parallel with the output terminals and capable of a parallel resonance with a total equivalent capacitance which is the sum of an equivalent electrostatic capacitance of the inverter device as observed from the output terminals toward an input side and an equivalent electrostatic capacitance of the load.

Namely, a resonant circuit having a relatively large constant which allows the influence of various stray impedances to be neglected is provided in the device, to thereby control the output voltage waveform and provide the following effects.

First, the source-drain voltage when the transistor is switched is minimized $\approx 0$), to thereby reduce the charge/discharge loss due to the capacitance $C_{OSS}$ between the source and the drain and thus improve the efficiency.

Second, the output voltage waveform is reduced until it has a small peak value relative to the mean value of the source-drain voltage, i.e., a small crest factor, whereby the mean input voltage value ($\approx$ input d.c. voltage) is increased to thus permit an increase of the input electric power.

DESCRIPTION OF THE PREFERRED EMBODIMENTS

Embodiments of the present invention will be described with reference to the drawings.

First, the theory of the present invention will be described for a better understanding thereof. To control the output voltage waveform as desired, an inverter must be driven by a constant current. To achieve this an inductance (RFC) is inserted between at least one of the input terminals of the inverter and a d.c. power supply. In this case, the output voltage waveform is determined by the input current waveform (a rectangular wave produced by the switching of d.c. current by the inverter), a load, and the impedances in the circuit.

Figure 4:
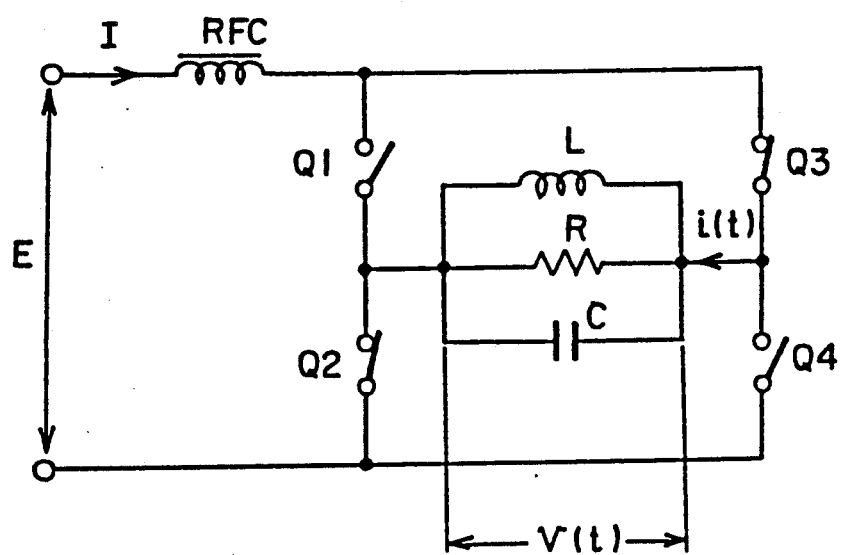
FIG. 4 is an equivalent circuit diagram of an inverter device in which impedances within the circuit are concentrated at a load end.

FIG. 4 shows an equivalent circuit of an inverter device, the circuit impedance of which (including $C_{OSS}$) is concentrated at a load end. In the figure, RFC denotes a choke coil, and Q1 to Q4 denote switching elements for which, in practice, transistors are used. As indicated by L, R, and C, impedances in the inverter circuit are equivalently concentrated at a load end; C includes the source-drain capacitance $C_{OSS}$; I denotes an input current; and v(t) denotes a voltage at the output terminal.

Figure 5:
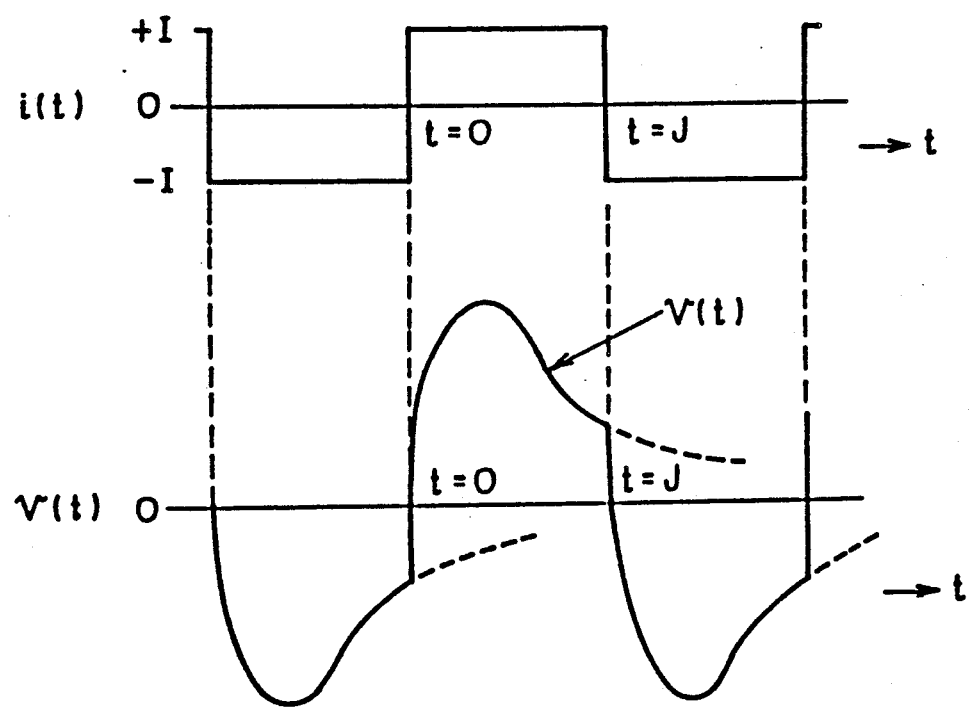
FIG. 5 is a chart showing a voltage and current across the load.

FIG. 5 shows the voltage across the load and the waveform of the current flowing to the entire load.

The voltage v(t) across the load is also applied across the MOS transistors which are in an off state, and accordingly, the waveform of the source-drain voltage of the MOS transistors is approximately identical to that of the output voltage.

According to studies by the inventors, the output voltage waveform can be approximately expressed by the following formulae:

$$\zeta = (1/2R) \cdot \sqrt{L/C}$$

$$\omega_n = 1/\sqrt{LC}$$

where I: input d.c. current value $$1 - \zeta^2 = K^2$$

When $\zeta < 1$, $$v_0(t) = (IL\omega_n/K)e(-\zeta_n t) \cdot \sin K\omega_n t \quad (1)$$

when $\omega = 1$, $$v_0(t) = IL\omega_n^2 e) - \omega_n t) \quad (2)$$

and when $\zeta > 1$, $$v_0(t) = (IL\omega_n/K)e(-\zeta\omega_n t) \cdot \sinh(K\omega_n t) \quad (3)$$

where t is in the range of $0 \leq t \leq (\frac{1}{2}f)$ provided $t=0$ at the rise time of the rectangular current wave, and thus there is a repetition of a general impulse response waveform of a secondary factor. As is clear from the above formulae (1), (2) and (3), by suitably selecting the values of L, C and R, it is possible to change the output voltage waveform to a great extent.

The voltage value after a half-period from the inversion of the current waveform due to the switching of the transistors can be expressed as $v_0(\tau)$, by using the aforesaid $v_0(t)$, where $\tau = \frac{1}{2}f$. In this case, the energy accumulated in the $C_{OSS}$ of the transistors which are in an off state is $$\Delta E = (N/2)C_{OSS}v^2(\tau) \quad (4)$$

which is consumed in the transistors when they are next turned on. At this time, a current flows to the transistors, which have been made on to charge the $C_{OSS}$ thereof to an equal voltage level, and thus a loss occurs. This energy is similarly given by $$\Delta E = (N/2)C_{OSS}v^2(\tau) \quad (5)$$

Accordingly, the overall loss of the circuit at each switching is $$\begin{aligned} E &= 2 \times (\Delta E + \Delta E) \\ &= 2NC_{OSS}v^2(\tau) \end{aligned} \quad (6)$$

Since the loss occurs twice in each period, then the total loss Pl is $$Pl = 4NfC_{OSS}v^2(\tau) \quad (7)$$

where N is the number of MOS transistors connected in parallel.

As is clear from this formula, by reducing the source-drain voltage $v(\tau)$ when switching the transistors to 0, Pl can be made zero.

From the formula (1) this condition is given by $$\zeta < 1 \text{ and } \sqrt{1 - \zeta^2} \omega_n t = \pi \quad (8)$$

$$\therefore \tau = 1/2f \text{ then } \sqrt{1 - \zeta^2} fn = f \quad (9)$$

Figure 6:
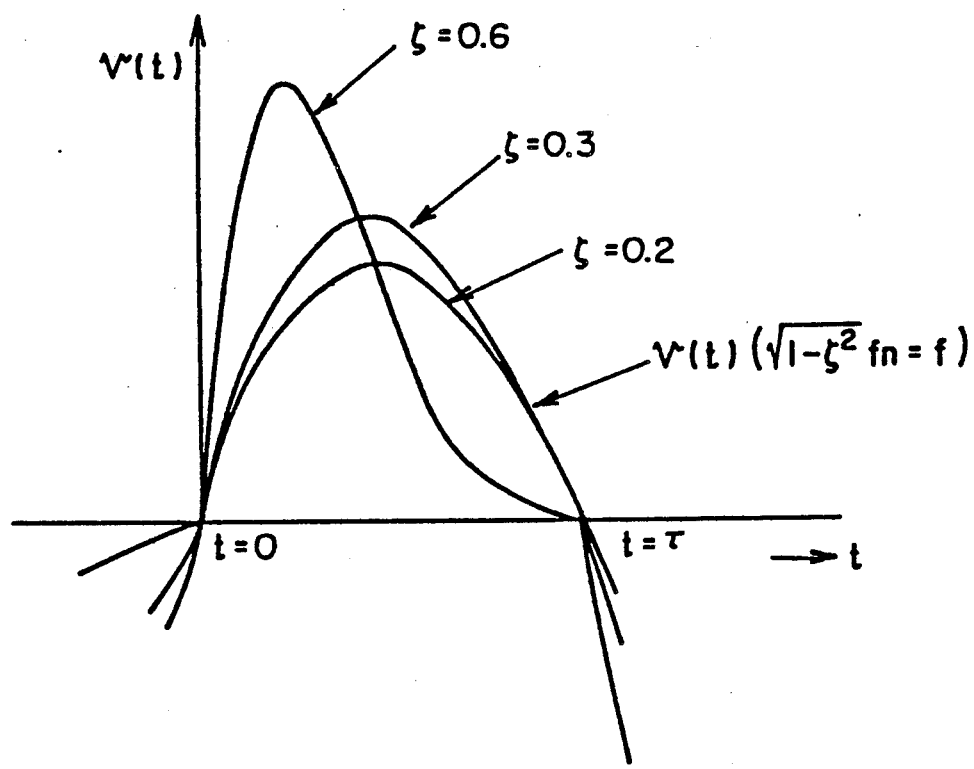
FIG. 6 is a chart showing changes of an output voltage waveform with respect to L, C, and R.

FIG. 6 shows changes of the output voltage waveform with respect to L, C and R, wherein the above conditions are fulfilled. The input power is equal for each waveform, and thus the smaller the value $\zeta$, the smaller the peak voltage value of the waveform, and accordingly, the input electric power can be increased. The limit is $\zeta = 0$ where the waveform is a sine wave. This means $R = \infty$, and electric power cannot be supplied to the load. Therefore, in practice, $\zeta$ is set to a relatively small value. According to experiments, when $\zeta = 0.3$, the waveform can be regarded almost as a sine wave, and a large increase in the input electric power ensured. As seen from the above, the optimum value for L, C, and R can be obtained from $$\zeta \leq 0.3 \text{ and } \sqrt{1 - \zeta^2} fn = f \quad (10)$$

Unrealistically the condition is expressed using the equality sign, and thus an allowable range must be provided. Generally, to ensure the efficiency of the inverter, about 80% is permissible. In this case, a permissible range for the difference of the switching timing, i.e., the difference between the intrinsic frequency $\sqrt{1 - \zeta^2}fn$ of the waveform and the switching frequency f, is obtained.

The output power $P_O$ obtainable at load R is expressed as follows, using the formula (1), $$\begin{aligned} P_O &= (1/\tau)\int(1/R)v^2(t)dt \\ &(0 \leq t \leq \zeta) \end{aligned} \quad (11)$$

From the formula (7), the value of the loss is at a maximum when a total C is given by $C_{OSS}$, then where $$\begin{aligned} 2NC_{OSS} &= C, \\ Pl &= 2fCv^2(\tau) \end{aligned} \quad (12)$$

and if the loss rate $\xi$ is defined as a reciprocal of the efficiency, $$\xi = (Pl/P_O) \quad (13)$$

then $\xi$ is a function of only $\zeta$ and $$k = \sqrt{1 - \zeta^2} fn/f$$

Figure 7:
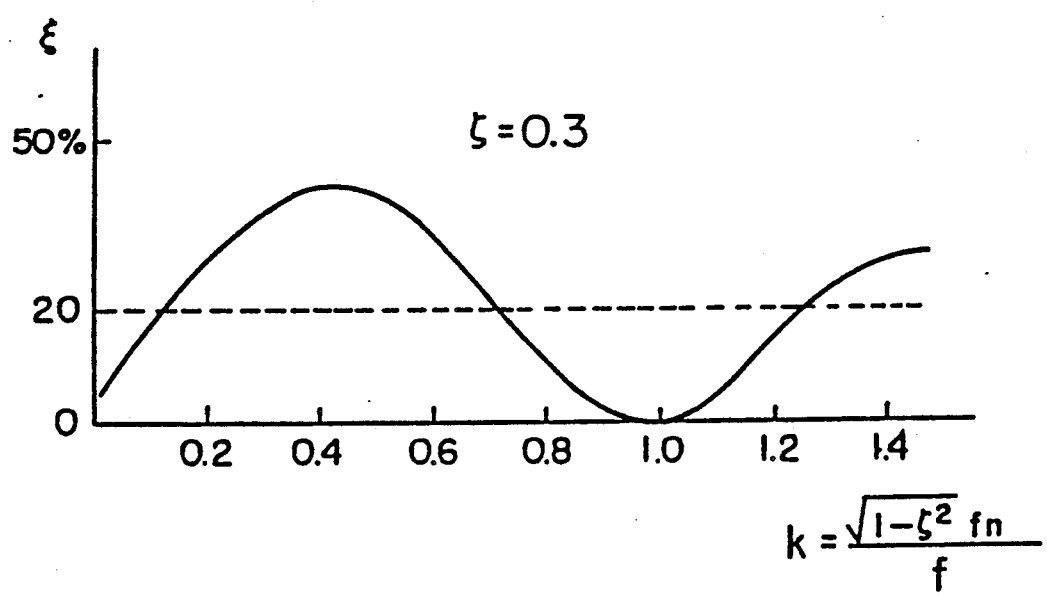
FIG. 7 is a chart showing the relationship between k and a loss rate.

FIG. 7 shows the relationship between k and the loss rate. Since k is an index of the above-mentioned frequency difference, k and the loss rate $\xi$ are plotted along the axes of abscissa and ordinate, respectively.

Under the condition $\zeta = 0.3$, $$0.75 \leq k \leq 1.25$$

$$\xi \leq 0.2 \quad (14)$$

Therefore, under the conditions $$\zeta \leq 0.3 \tag{15}$$

$$0.75f \leq \sqrt{1-\zeta^2}\, fn \leq 1.25f$$

$$\zeta = (1/2R)(\sqrt{L/C})$$

$$fn = 1/2\pi \sqrt{LC}$$

a practical maximum output can be obtained.

Figure 1:
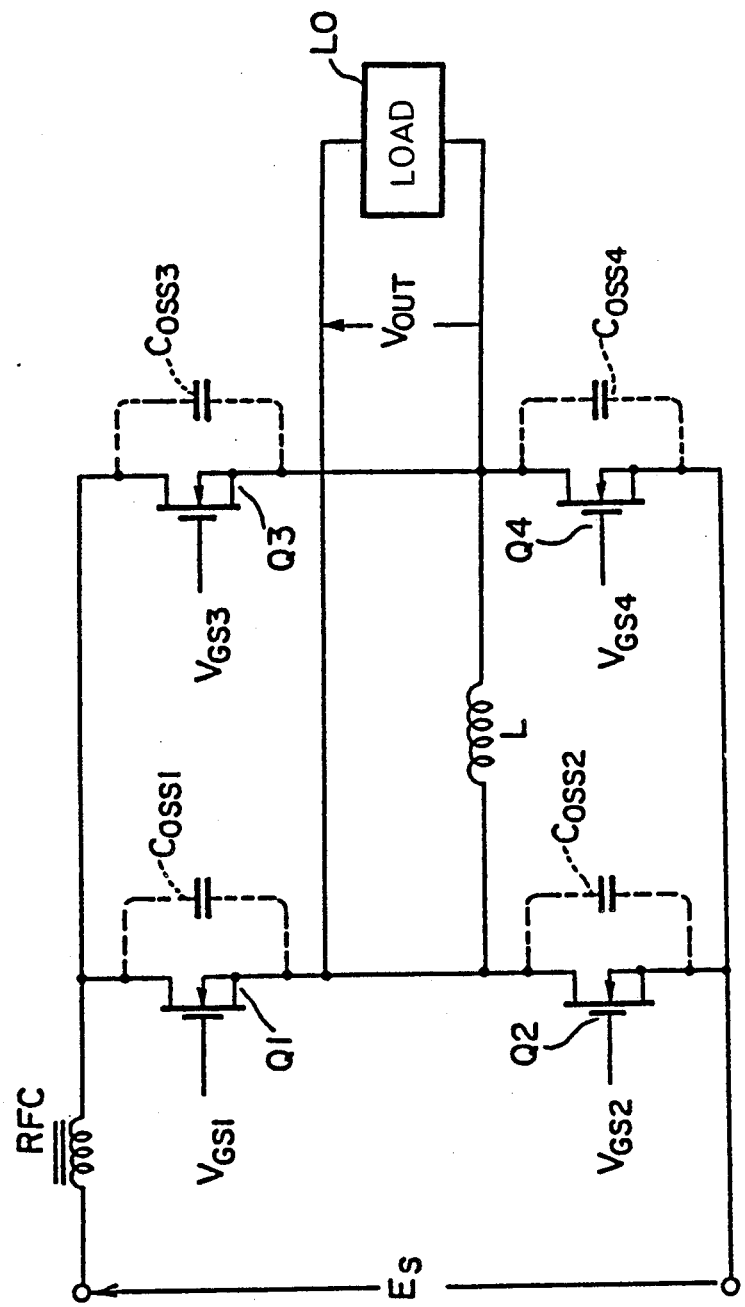
FIG. 1 is a circuit diagram showing a first embodiment of the present invention.

FIG. 1 shows a first embodiment of the present invention. In the figure, a d.c. power supply Es is applied to the input terminals. RFC denotes a choke coil, and Q1, Q2, Q3 and Q4 denote N-channel MOS transistors, to thereby constitute an inverter circuit. Gate signals $V_{GS1}$, $V_{GS2}$, $V_{GS3}$ and $V_{GS4}$ are respectively applied to the gates of the transistors. Note, $V_{GS1}$ and $V_{GS4}$ are the same signal and $V_{GS2}$ and $V_{GS3}$ are the same signal. When the transistors Q1 and Q4 are simultaneously turned on a forward current flows through a load LO, and when the transistors Q2 and Q3 are turned on, a reverse current flows through the load LO. The frequency of the current flowing through the load LO is determined by the frequencies of the gate signals $V_{GS1}$, etc.

$C_{OSS1}$, $C_{OSS2}$, $C_{OSS3}$, and $C_{OSS4}$ represent the drain-source output capacitances of the transistors Q1, Q2, Q3, and Q4, respectively, and L represents the inductance selected to be in a parallel resonance with the impedance, as observed from the inverter side of the load LO, to fulfill the aforesaid formulae (15). LO denotes the load, which may be a laser tube of a high-frequency pumping $CO_2$ laser, a high-frequency heat furnace, or the like. The net resistance value of the load is R.

Figure 2:
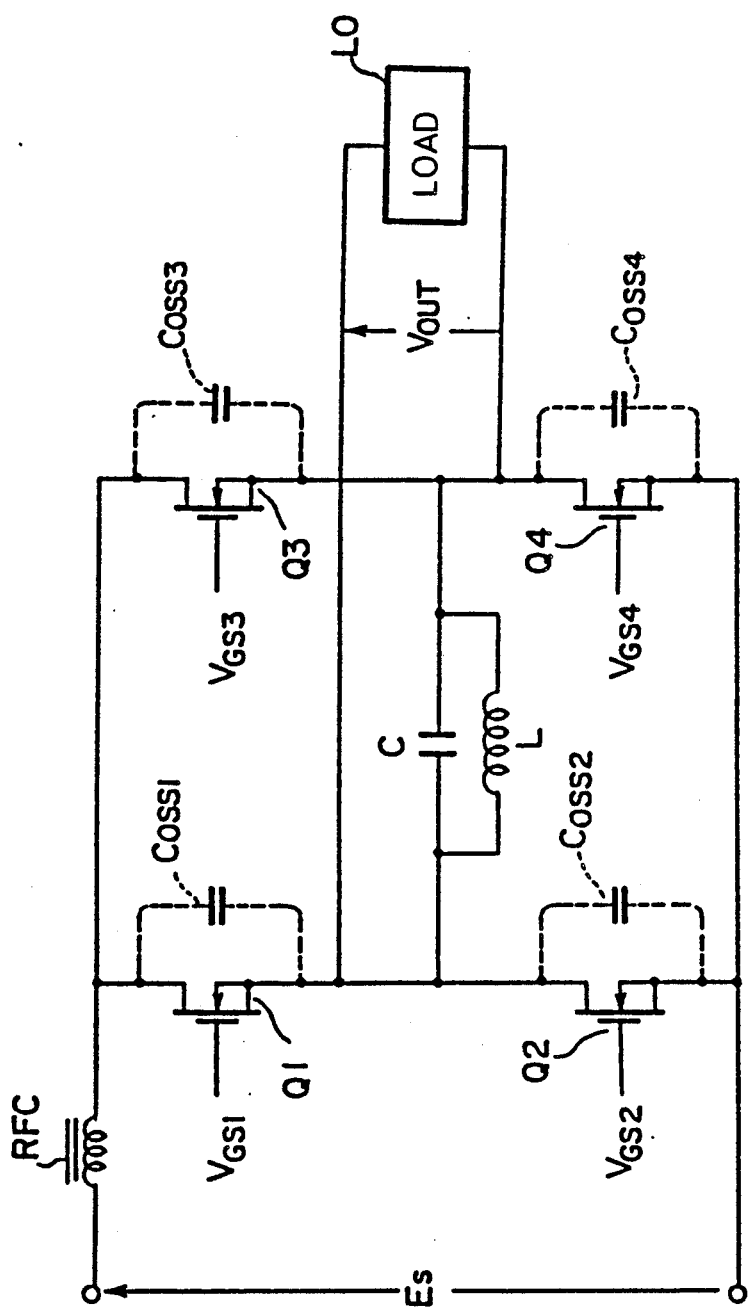
FIG. 2 is a circuit diagram showing a second embodiment of the present invention.

FIG. 2 shows a second embodiment in which a capacitor C is added at the output end impedance. When the value of the capacitor C is small as in the first embodiment and the formulae (15) are not fulfilled, a capacitor C is connected in parallel with the inductance L, to thereby fulfill the formulae (15).

Figure 3:
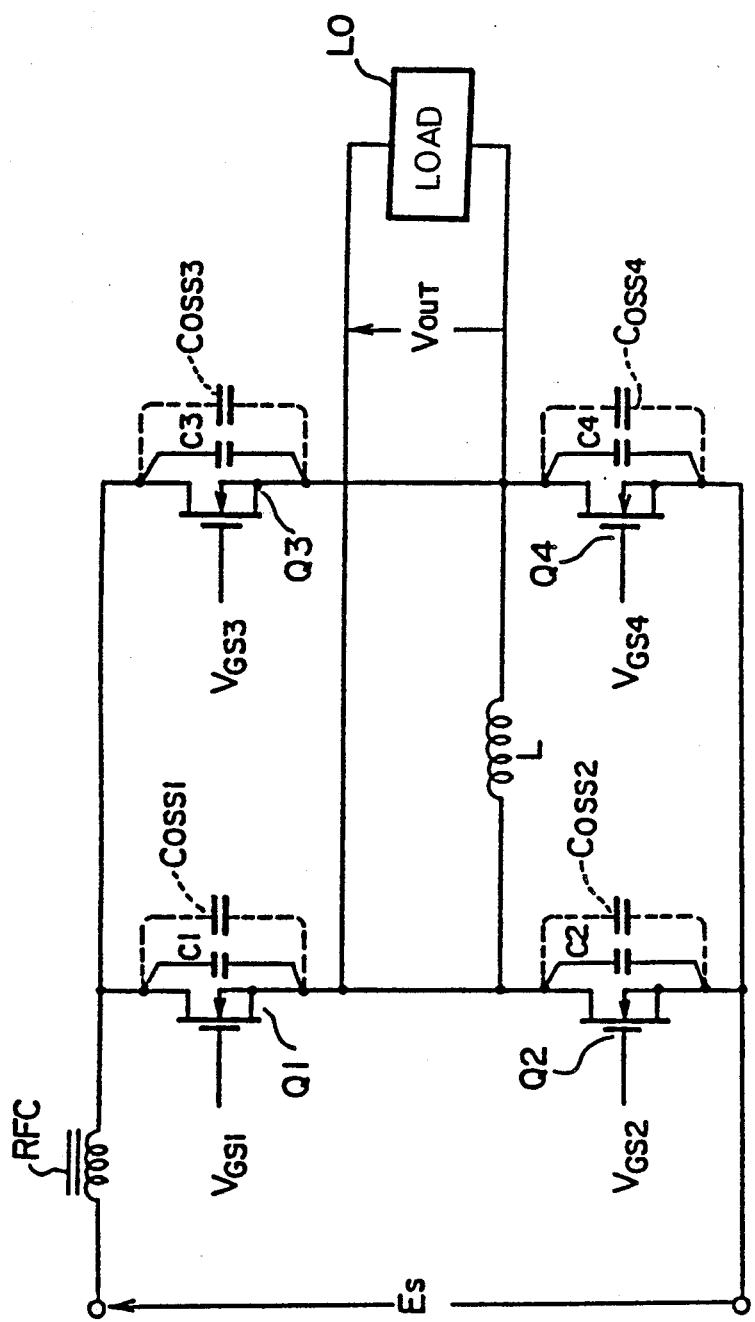
FIG. 3 is a circuit diagram showing a third embodiment of the present invention.

FIG. 3 shows a third embodiment not using an additional capacitor C, as in the second embodiment, but in this embodiment, capacitors C1 to C4 are connected between the source and drain of the respective transistors Q1 to Q4. Namely, since the influence of the stray impedance in the inverter circuit is large, a resonance is obtained between both ends of each transistor; if not, the waveforms at both ends of the transistors will not be improved.

Instead of adding the capacitors C1, etc. to the respective transistors, the number of parallel connections of the transistors may be changed to adjust the impedance so as to fulfill the resonance condition.

As described above, according to the present invention, the parallel resonance condition of a current inverter is adjusted to optimize the output voltage waveform, permit an increase in the input electric power, and minimize the loss, whereby the output power of the inverter is remarkably increased.

I claim:

1. An inverter device having an equivalent electrostatic output capacitance and including:
    input terminal means for receiving a d.c. voltage input;
    output terminals connectable to a load having an equivalent electrostatic capacitance;
    an inductance element (RFC) having one end operatively connected to said input terminal means and another end connectable to receive the d.c. input voltage;
    at least one MIS transistor operatively connected in series between said input terminal means and said output terminals and connectable to receive a drive signal having a single frequency; and
    another inductance element operatively connected in parallel with said output terminals and having an inductance selected to achieve parallel resonance with a total equivalent capacitance which is sum of the equivalent electrostatic output capacitance and the equivalent electrostatic capacitance of the load.

2. The inverter device according to claim 1, further comprising:
    a capacitance element operatively connected in parallel with said output terminals, and wherein the inductance of said another inductance element is selected to achieve parallel resonance with a total equivalent capacitance at said output terminals including a capacitance of said capacitance element.

3. The inverter device according to claim 2, further comprising:
    an additional capacitance element operatively connected in parallel with said MIS transistor, and wherein the inductance of said inductance element is selected to achieve parallel resonance with an equivalent output capacitance at said output terminals including a capacitance of said capacitance element.

4. The inverter device according to claim 3, having elements satisfying $$\zeta = (1/2R)\sqrt{L/C}$$

$$fn = 1/(2\pi \sqrt{LC})$$

$$\zeta \leq 0.3$$

$$0.75f \leq \sqrt{1-\zeta^2}\, fn \leq 1.25f$$

stand, where R is a net parallel resistance value at said output terminals including a resistance of the load, C is the total equivalent capacitance, L is the inductance at said output terminals, and fn is an operating frequency of said inverter device.

5. The inverter device according to claim 1, further comprising:
    a capacitance element operatively connected in parallel with said MIS transistor, and wherein the inductance of said another inductance element is selected to achieve parallel resonance with an equivalent output capacitance at said output terminals including a capacitance of said capacitance element.

6. The inverter device according to claim 2, having elements satisfying $$\zeta = (1/2R)\sqrt{L/C}$$

$$fn = 1/(2\pi \sqrt{LC})$$

$$\zeta \leq 0.3$$

$$0.75f \leq \sqrt{1 - \zeta^2} \, fn \leq 1.25f$$

stand, where R is a net parallel resistance value at said output terminals including a resistance of the load, C is the total equivalent capacitance at said output terminals, L is the inductance at said output terminals, and f is an operating frequency of said inverter device.

7. The inverter device according to claim 1, further comprising:

additional MIS transistors connected in parallel, each of said MIS transistors having a capacitance $C_{OSS}$, and a number of said MIS transistors satisfying $$N = C/2C_{OSS}$$

stands, where C is the equivalent electrostatic output capacitance.

8. The inverter device according to claim 1, having elements satisfying $$\zeta = (1/2R) \sqrt{L/C}$$

$$fn = 1/(2\pi \sqrt{LC})$$

$$\zeta \leq 0.3$$

$$0.75f \leq \sqrt{1 - \zeta^2} \, fn \leq 1.25f$$

stand, where R is a net parallel resistance value at said output terminals including a resistance of the load, C is the total equivalent capacitance, L is the inductance at said output terminals, and fn is an operating frequency of said inverter device.

* * * * *